3,525,982
SYSTEM FOR AUTOMATICALLY IDENTIFYING GRAPHICAL SYMBOLS SUCH AS ALPHABETICAL AND/OR NUMERICAL CHARACTERS
Charles Cooreman and Jean Heinisch, Colombes, France, assignors, by mesne assignments, to Compagnie Internationale pour l'Informatique, Louveciennes, France, a corporation of France
Filed Mar. 29, 1966, Ser. No. 538,357
Claims priority, application France, Mar. 30, 1965, 11,263; Mar. 15, 1966, 53,393
Int. Cl. G06k 5/00
U.S. Cl. 340—146.3
17 Claims

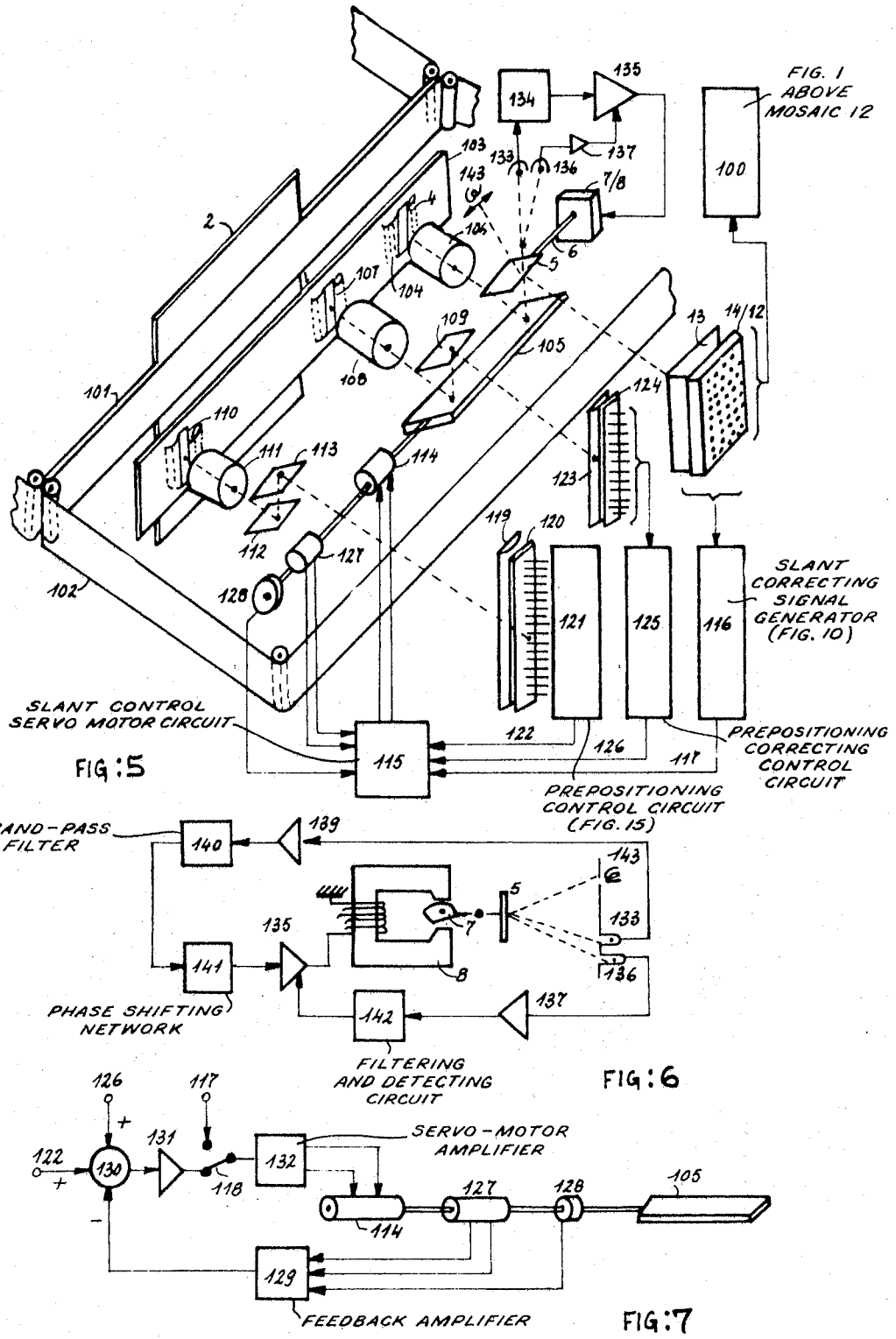

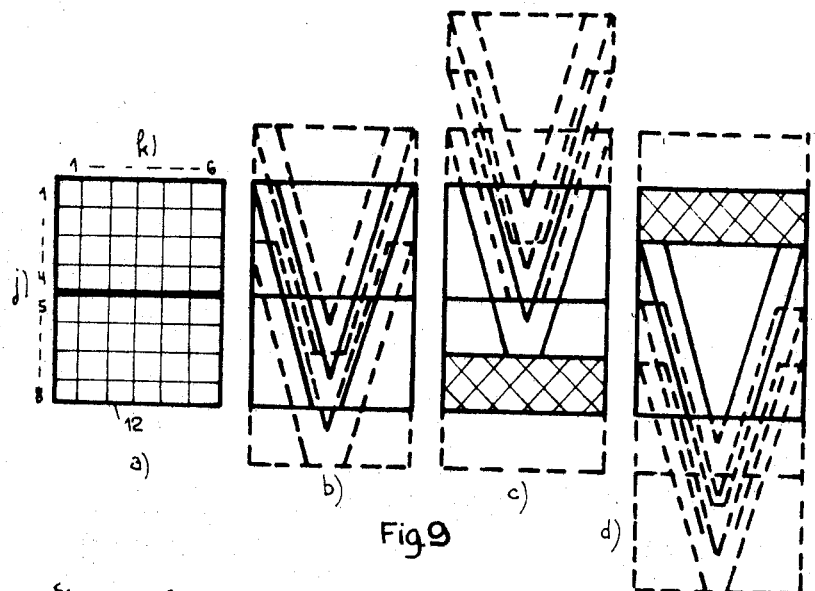
Fig. 8
Fig. 9
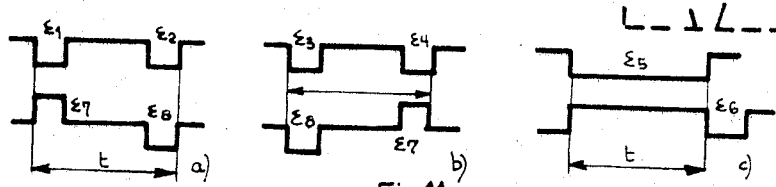
Fig. 11
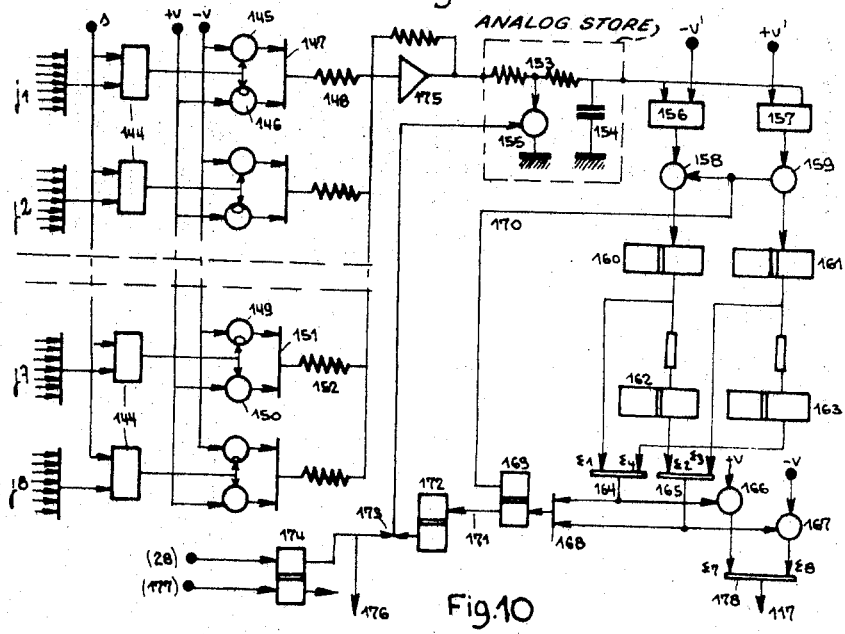
Fig. 10

# United States Patent Office 3,525,982
Patented Aug. 25, 1970

ABSTRACT OF THE DISCLOSURE

A system for identifying graphical symbols which are driven in continuous fashion past the read-out window of a photocell reader including a mosaic of photocells. Individual photocell outputs are applied to identification function translating devices that include an OR output of time variable voltages. The OR output is applied to an analog voltage store which retains the maximum voltage value applied to the store. The stored voltage is read out and compared with all voltage values at the outputs of the identification function translating devices such that an identity between the stored voltage and the output of a translating device is effective to energize a temporary store associated with the identification function translating device. The temporary store is connected on its output to a particular symbol output channel. Preferably, several successive read-outs of the analog store are made and the original identification is preserved if no further identity signal appears within a given interval after the first identification.

---

The present invention concerns improvements in or relating to systems for automatically identifying graphical symbols such as alphabetical and/or numerical characters as they appear in any distribution of sequence on a support by which they may be read out from photoelectric pick-up means, or the like.

In such systems, the number of characters to be read and identified is obviously finite. It has been already proposed to derive from the photoelectric read out of each and any of said characters a predetermined plurality of electric signals which are each representative of the average value of the light from as many elementary areas which are defined by the structure of the read out device in the surface occupied by each character, and to compare the distribution of amplitudes of such signals to amplitude distributions each of which defines a particular one of the said characters; a substantial identity of a read out distribution of signal amplitudes and of a reference distribution ensures the desired identification of a character.

Further it has already been proposed to effect such a comparison of amplitude distributions without having recourse to an actual generation of sets of reference electric signals, to apply the electric signals generated by a read out of a character on the inputs of as many function translating or simulating devices as are reference characters to take into account for the sought identification, each such device comprising a plurality of attenuation networks receiving the elementary signals from the read out device and combining such signals in accordance with a predetermined law of function, which may be named an identification function so that when the distribution of amplitudes of the incoming signals corresponds to the reference distribution represented by said function, the output of the device presents a predetermined condition and, for instance, has a maximum amplitude value.

A system for automatically identifying graphical symbols, and specially characters, according to the above defined prior art thus comprises the combination of a read-out device generating for each character the said plurality of electric signals where each signal is representative of the average light value of a fictitious square in the surface occupied by the character on its support, as many function translating devices as are distinct characters or symbols to be identified, each being adjusted to a reference distribution of average light values of such squares for a particular character, and as many circuits connected to the outputs of said function translating devices for detecting the passages of said outputs to a condition characteristic of the identity of a read-out character and a reference character as represented by the translation law, or identification function, of the concerned translating device.

It is obvious however that the support of the symbols or characters must move with respect to the read-out device. In the prior art systems such as defined above, the motion of the support was ensured in a step-by-step fashion. Obviously too, it would be of advantage, for quickness of operation and for speed of identification, as well as to avoid undue complications in the accurate positioning of the support at each step, that a system be provided wherein the support for the symbols or characters can be driven at a uniform and rapid rate through the read-out device.

It is the object of the invention to provide such a system wherein the support of the symbols and characters can move at a suitably high speed in a uniform drive while the symbols and characters are read out and wherein the identification processing is, nevertheless, accurate and reliable.

Further, the support of symbols or characters ought to be so accurately positioned, during its motion through the read out device, that each symbol or character appears accurately framed in the direction perpendicular to the direction of the drive. This could lead to drastic conditions of embodiment which are obviously straining.

It is a further object of the invention to provide a system of the defined kind where such framing servitude is substantially reduced if not eliminated.

Further, the position of the symbols or characters on their support may not be of sufficient steadiness, particularly from support to support.

It is a further object of the invention to provide a system of the defined kind where such defaults are automatically corrected without recourse to a mechanical control of the positions of the supports.

These and further objects, and the means provided in the invention for accomplishing them, will be explained in full detail with reference to the accompanying drawings, wherein:

FIG. 5 shows another illustrative embodiment of a system according to the invention;

FIG. 6 shows an illustrative embodiment of the control device of an oscillating mirror in the embodiment of FIG. 1 or 5;

FIG. 7 shows a block scheme of the servo-mechanism included in the system of FIG. 5;

Figure 12:
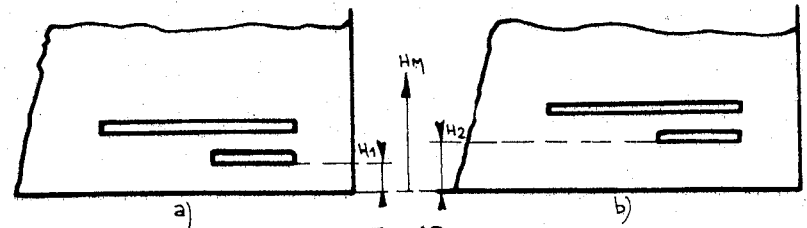
Figure 13:
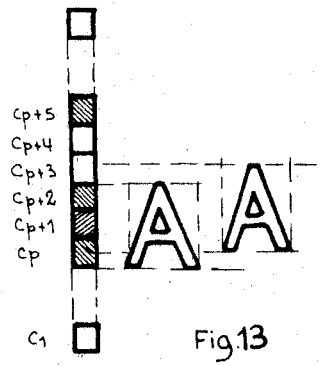
Figure 14:
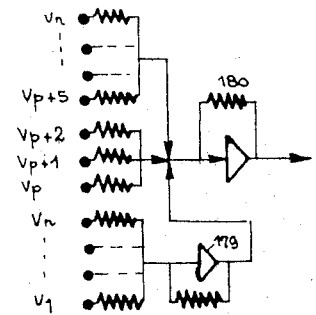
Figure 17:
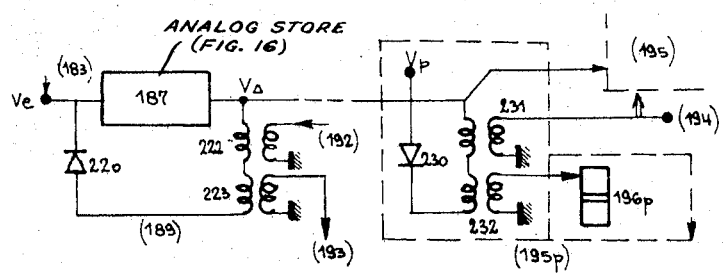
Figure 15:
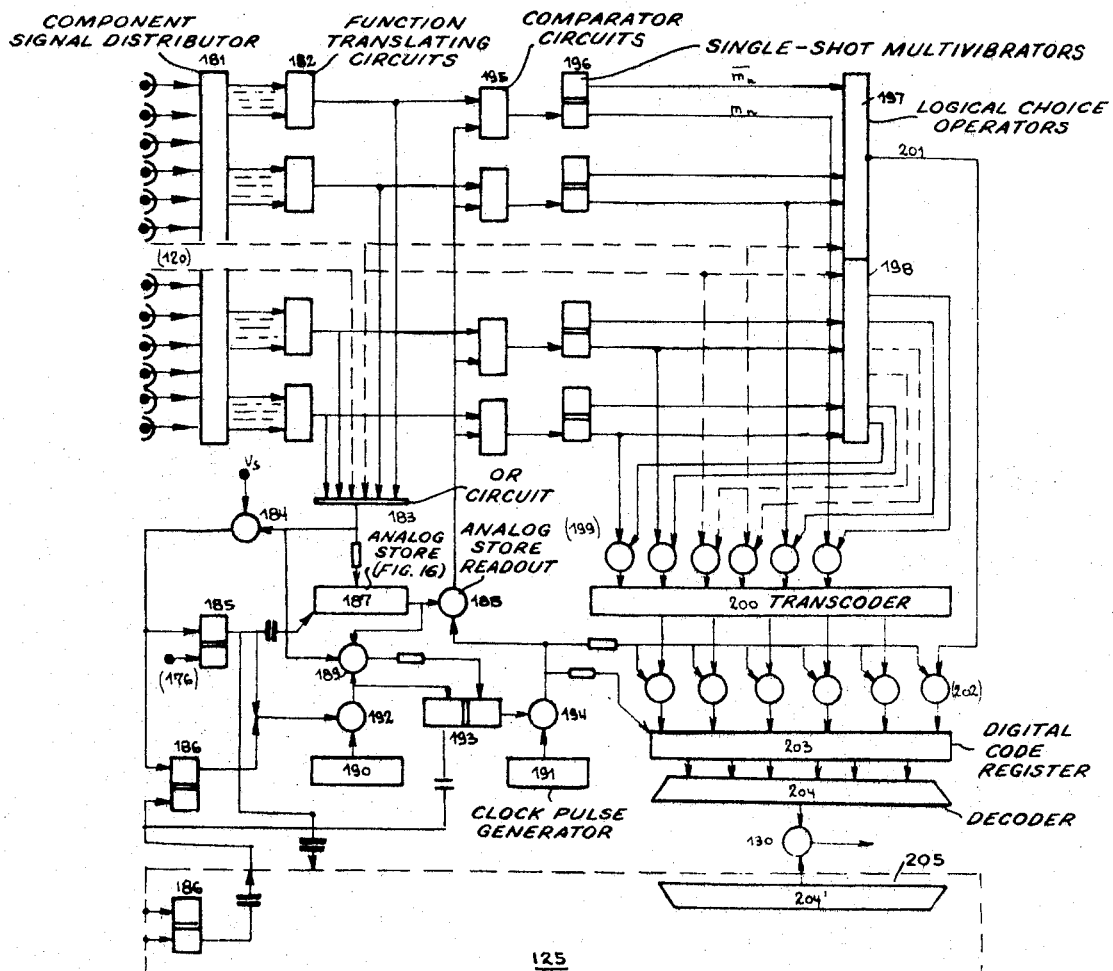
Figure 16:
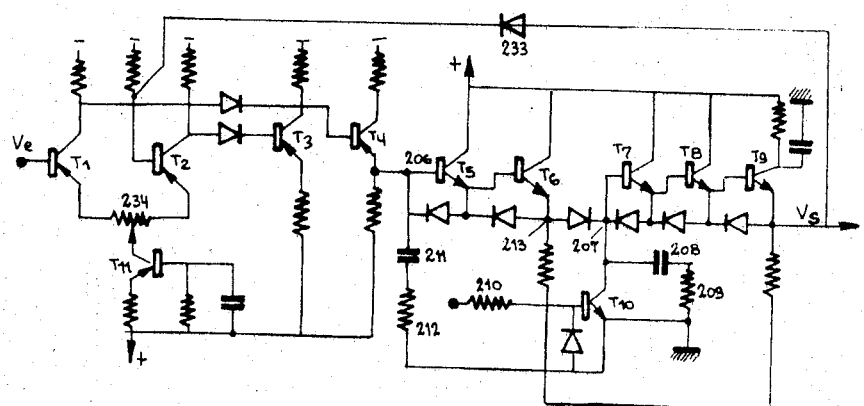

FIGS. 8 and 9 respectively show certain causes of ill presentation of the symbols in the read out device and their resulting effects on the framings of the characters and symbols on the opto-electric converter of said read out device;

FIG. 10 shows an example of embodiment of a correcting device associated to the read-out device for such defaults as defined from FIGS. 8 and 9;

FIG. 11 shows graphs of signals issuing from and utilised in the device of FIG. 10;

FIG. 12 shows departures from a line of symbols or characters from one edge or their support or carrier;

FIG. 13 shows how a character may occupy a position with respect to a column of photoelectric elements in view of the control of a prepositioning arrangement making part of the system of FIG. 5;

FIG. 14 shows an example of embodiment of a function translating device used in said prepositioning arrangement;

FIG. 15 shows an example of embodiment of such a prepositioning arrangement;

FIG. 16 shows an illustrative embodiment of an analog store incorporated in this prepositioning device;

FIG. 17 shows a diagram of the read-out arrangements for said analog store; and

Figure 18:
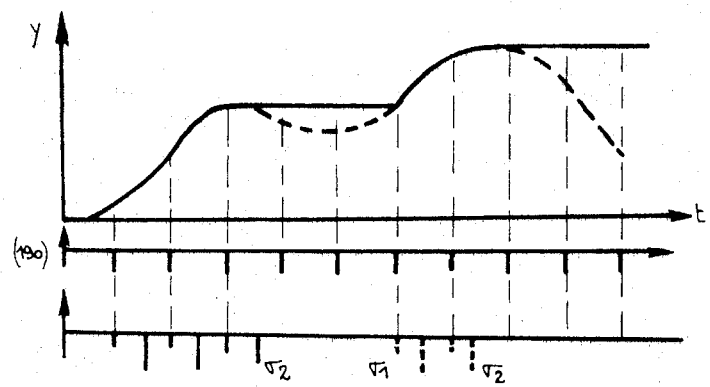

FIG. 18 shows graphs aiding the explanation of the operation of said read-out arrangements.

Any technological variation of the described and shown examples remains within the scope of the invention.

In the concerned examples, the system handles alphabetical and/or digital characters which are printed or typed (or are otherwise formed) on a document 2 constituting a support or carrier for the characters 1 and travelling in the direction of the arrow $x$ in a slide 3 of a reader forming part of a read-out device. A window 4 is lighted from a pencil issued from a source 61 associated to a lens 62 and a mirror 63 for supplying the light to a light guide 52. If useful, several such lighting arrangements may be associated for uniformly lighting the window 4.

The light reflected from the window 4 is guided on a mirror 5 by a lens 10 and this mirror 5 reflects the light to a mosaic 12 of photoelectric converters such, for instance, as photodiodes through a collimating lens 13 and as many light guiding small lenses 14 as are members in said mosaic. Preferably all the lenses 14 are jointive and small parabolic mirrors so as to further concentrate the light on the photo diodes, the impinging light passing through holes at their apices. The purpose of the lens 13 is to render parallel any light ray impinging on the mosaic of lenses 14. No parasitic light can thus impinge on a photodiode. The image of the window 4 is thus formed on the mosaic and consequently the image of any symbol or character passing through this window.

Figure 3:
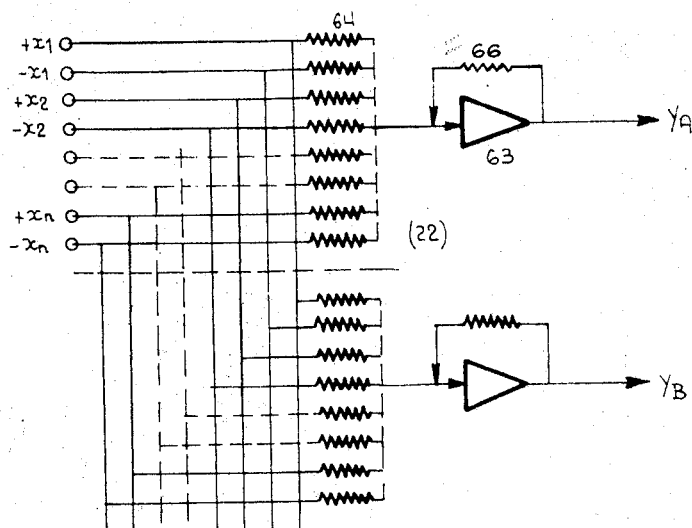
FIG. 3 shows an illustrative embodiment of a function translating device for a function with linear coefficients.

Each photodiode of the mosaic 12 presents an output current which is at any instant of time proportional to the average light value it receives. The output signals from the photodiodes constitute the components of what may be considered as an overall read out signal. They are applied to the inputs of as many amplifiers 15 which do not pass the direct current but, from a conventional arrangement of restitution of such a D.C. component, duly set the signal bases on the "white" level of the paper of the document to a determined potential, zero for instance. The amplifiers 15 deliver at their outputs the component signals, from $x_1$ to $x_n$ and, from associated inverter amplifiers, the component signals from $-x_1$ to $-x_n$ of reversed polarities with respect to the signals $x_1$ to $x_n$. These signals are applied through a distributor 21 (a mere set of distributing leads wired in this respect) to the inputs of as many function translating devices or circuits as are symbols of characters to identify from the read-out. Each translating circuit is provided for a distinct identification as being set with a distinct identification function as will be hereinafter described. Illustratively, for a linear coefficient identification function, a function translating device may be such as is shown in FIG. 3. It essentially comprises a summing amplifier 63 with a high negative feedback loop at 66, the input of which is fed with the result of an OR-operation on the component signals, from $x_1$ to $-x_n$, obtained through attenuating series networks 64 to the inputs of which they are distributed by 21. The setting of an identification function is made by an appropriate choice of the values of the resistances 64 in correspondence to the values of the coefficients of the terms of the identification function, which adjustment of resistance values is made conventionally with respect to the analog computer technique. At this point in the description it is sufficient to consider that, each time a set of incoming component signals will coincide with the distribution of coefficients of an identification function on said resistance networks, the output of the concerned function translating device will take a characteristic value, not otherwise obtainable, and for instance a maximum value definitely higher than any other output value issuing from a circuit for which such identity does not exist.

Figure 1:
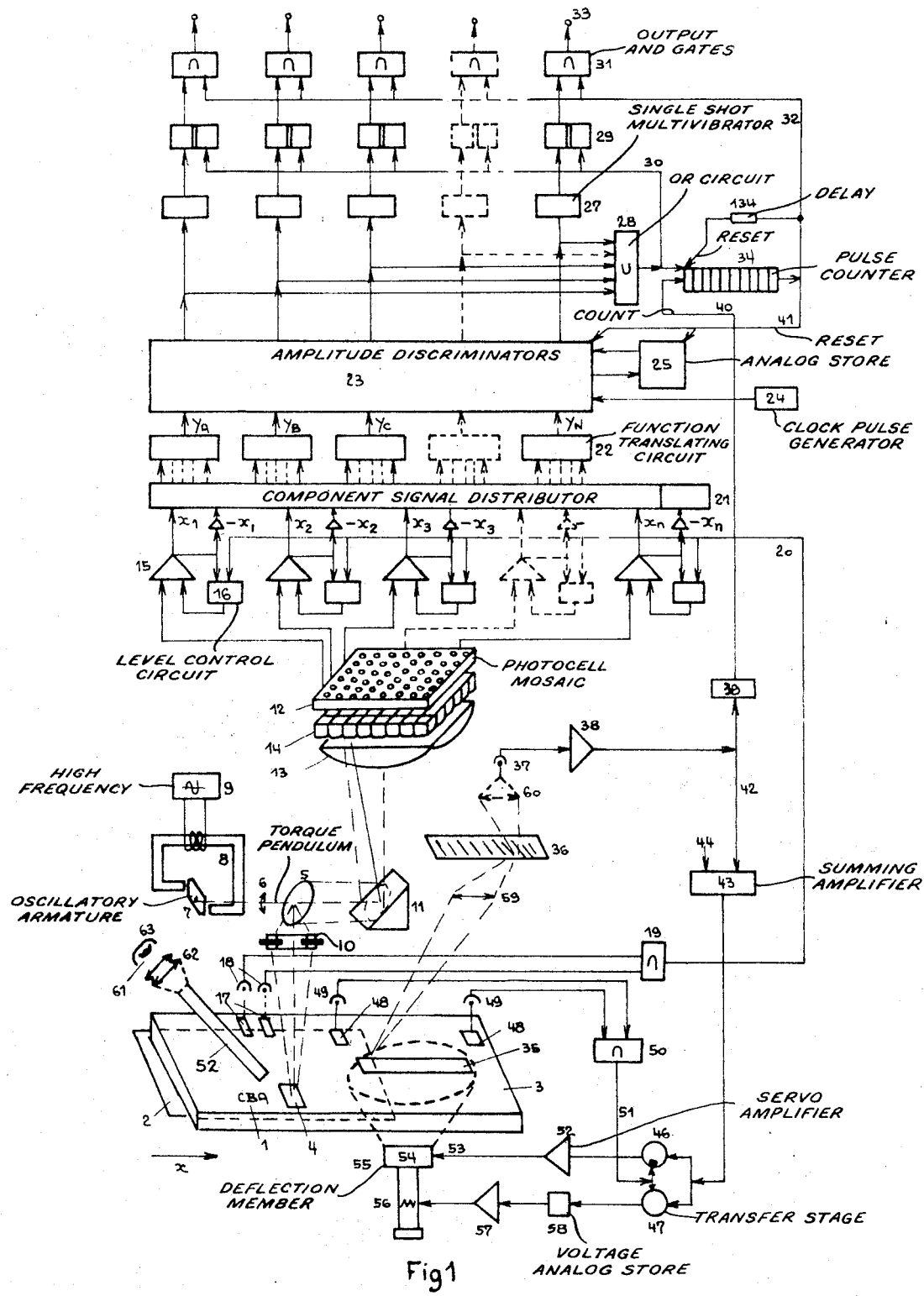
FIG. 1 shows an illustrative embodiment of a system according to the present invention.

If the read out of a character was made with said character stopped and framed in the window 4, it would suffice to observe the output voltages from the devices 22, $Y_A$, $Y_B$ ... $Y_N$ by applying them on a circuit discriminating the higher one of said voltages. Such a discriminator 23 may comprise means for selecting the higher value voltage from any and all outputs of the devices 22 and means for simultaneously forming in as many channels as are such outputs the difference value signals between said higher value voltage and each of any of said output voltages, said last named means comprising means for superimposing a readout pulse to any of such differences and consequently translating to a temporary store an activation pulse only from the channel in which said difference of voltages is substantially zero. In the scheme of FIG. 1, such discriminator 23 is shown associated to a clock or time basis circuit 24 for such readouts. The activation of an output of the discriminator 23 is temporarily recorded by activation of a single-shot multivibrator 27 (a device which has a stable state from which, when it receives an activation pulse on its input it turns to another state which is only maintained during a predetermined time interval, whereupon it automatically returns to its previous stable state).

However, as in the proposed system the symbol carrier is in uniform motion, each symbol or character passes through the window 4 in a continuous fashion, though at a substantially constant speed, and the image of a character or symbol is only correctly framed in the window, during its passage, during a brief instant of time. This means that from a translating circuit 22 the output voltage will vary up to a maximum value and thereafter decreases. As the higher maximum value from all said circuits is needed for the above defined comparison process (formation of the said differences of said higher voltage and said individual output voltages), it is provided to associate to the discriminator 23 a special analog store capable of preserving at its output the higher voltage value of any time or variable voltage applied to its input. Such an evolutive analog store may be of the kind shown in FIG. 16, for instance, and essentially comprises a storage condenser 208 connected to the ground through a protection resistor 209 by one of its electrodes and connected by its other electrodes to a connection point 207 between two buffer arrangements (T5–T6 and T7–T8–T9 in the embodiment of FIG. 16); the upstream buffer arrangement operates, when so controlled to act as a source of current for charging the condenser 208; such a control is exerted each time the value of the input voltage $V_e$ is higher than that of the output voltage $V_s$, as compared in an input differential amplifier (T1–T2) receiving $V_e$ and $V_s$, this latter from a feedback comprising a unidirectional element such as a diode 233, through a follower stage T4. The store is reset to zero each time a reset pulse is applied at 210 for closing a discharge circuit for the condenser 208 to the ground through a transistor T10 acting as a switch in this respect.

Figure 4:
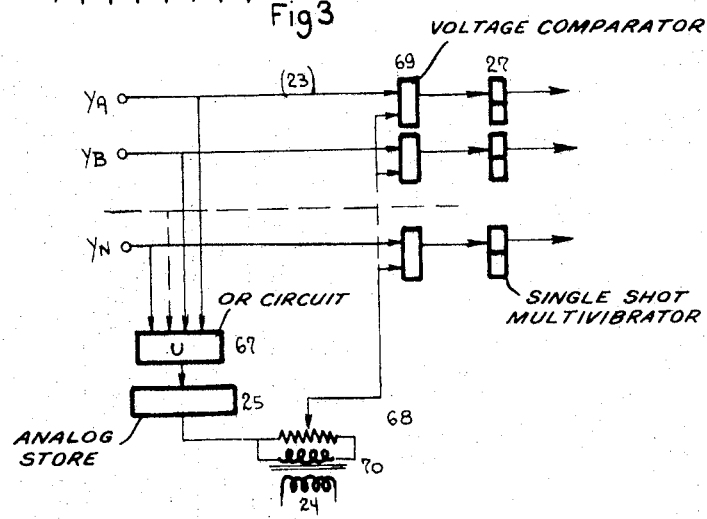
FIG. 4 shows a partial view from FIG. 1, for disclosing the operation of an analog store in said system.

FIG. 4 shows how such an evolutive analog store is associated to the discriminator 23 by being fed from an OR-circuit 67 operating on all the input variable voltages $Y_A$ to $Y_N$ from the function translating circuits 22. The output of said store 25 passes through a potentiometer 68 the tap of which reaches comparator inputs of circuits 69 forming the above said difference voltages, and said potentiometer is connected across the secondary winding of a transformer 70 the primary winding of which receives the pulses from the clock 24. It must be understood that each circuit 69 itself comprises some kind of rough storing member for the voltage Y of corresponding channel subscript, if needed, for ensuring a more accurate comparison though, ordinarily, the timing of the clock pulses from 24 is adjusted to ensure such an accuracy, i.e. said timing is such that for each character it will substantially coincide with the instants of passage of characters in the window 4 for which said characters are substantially framed in the direction of motion of their support across the window.

In the motion of the supports in the reader device variations of framing may occur in the direction perpendicular to that of the drive and further symbols may be slightly unframed from their very positions on their support. Assuming first that such departures are relatively small, it is provided first that, for ensuring that during its passage through the window 4, the image of a character or symbol on the mosaic 12 of photodiodes will always pass by an entirely correct framing condition, the mirror 5 is driven into an alternating oscillation movement, as being for instance carried by an arm 6 linked to the oscillating armature 7 of a magnet 8 the coil of which is supplied with a high frequency current from a stabilized generator 9. To the variation imposed by the movement of passage of the symbol or character across the window 4 is then superimposed a perpendicular displacement perpendicular to the first and of such a high frequency that the image of the character will be entirely framed on the mosaic of photodiodes in both directions during its passage across said window. In FIG. 1, the arm 6 which carries the mirror 5 actually constitutes a torque pendulum of integral formation receiving the mirror in one of its end and the oscillating armature 7 in its other end (said armature comprising a stack of magnetic laminae). The frequency of the generator 9 is adjusted for impressing on the moving assembly an alternating torque at the natural frequency of the said torque pendulum. The arm 6 may be supported at its mid-length, i.e. in its nodal point, so that it requires a minimum of energy at reasonance for its activation and maintenance of vibration. Another possible embodiment of the control arrangement of the oscillating mirror 5 will be described with respect to FIGS. 5 and 6, which embodiment may be plainly used in the system of FIG. 1 if desired.

Figure 2:
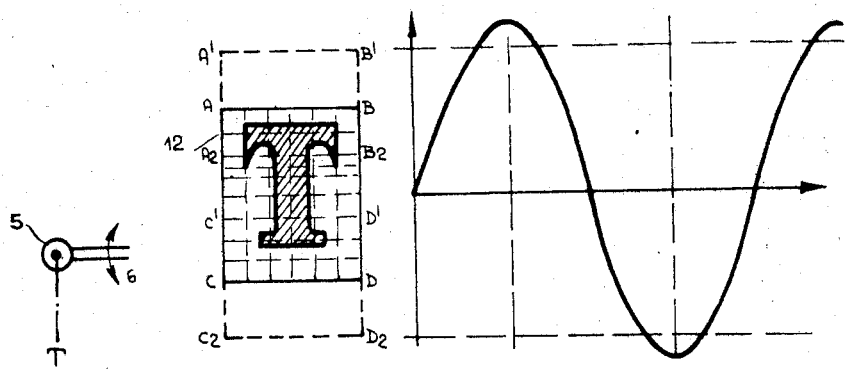
FIG. 2 shows a sketch for explaining the action of a cyclical variation of frame of the picture of a character in a direction perpendicular to the direction of the motion of the support through the read out device.

Considering FIG. 2, the rectangle ABCD defines the boundary of the mosaic 12. It is shown with eight rows of six squares but of course such numbers may be varied at will. From the oscillation imparted to the mirror 5, which is of sine-wave form as shown on the right-end part of the FIG. 2, the image of the symbol or character will sweep across the "vertical" direction of the mosaic from an extreme position $A^1B^1C^1D^1$ to the opposite one $A^2B^2C^2D^2$ and conversely. As said this oscillation being of a sufficiently higher frequency, at a time instant of the passage of the image of the character along the "horizontal" direction (on the drawing), the said image will be accurately centered or framed with respect to the mosaic.

Each of the temporary storing members 27 constitutes a separator stage between the corresponding channel of the discriminator 23 and the final decision of identification arrangement. For this purpose, each stage 27, when returning back to its stable state or condition, produces the actuation of a bistable stage 29. Any pulse issuing from the discriminator 23 to one of the members 27 is also routed by an OR-network or circuit 28 and a lead 30 to the reset inputs of the bistable stages 29 so that the one of said stages which was in its actuated condition is reset to its rest condition. Consequently, from the subsequent actuation of one of the bistable stages 29 from the return to rest of the stage 27 which has been actuated from the same pulse from 23, there is no possibility that two bistable stages 29 be actuated to work at the same time instant consequently, that no ambiguity will exist as to the identification of the character read out from the window 4.

Each bistable stage 29 is connected by one of its outputs, for instance the one which will be of high voltage in its actuated condition, to one of the inputs of an AND-circuit 31. For transmission of the identification signal to an identification output 33, it is necessary that said AND-circuit also receives an authorization signal on its other input. Such authorization signals will be applied to said AND-circuits 31 by a lead 32 from the output of a pulse counter 34 when said counter passes to its maximum count (and resets itself through a short delay 134). Said counter counts pulses received at 40 from a clock (which may take the form which will be later herein described) and is reset to zero each time a pulse issues from 28, that is to say each time an identification is "proposed" by the discriminator 23. The counter 34 after each reset to zero, counts the pulses from lead 40 and when no amendment of proposal is made and marked by a further issuance of a pulse from 28 during the time necessary for the counter 24 to reach its maximum count, an authorization pulse is applied on lead 32 to unblock the one of the AND-circuits 31 which receives an identification signal from the corresponding bistable stage 29 which has been brought to work from the return to zero of the one of the members 27 which has been set by the pulse of proposed identification from the discriminator 23.

The rate of pulses from the time basis or clock 24 is higher than the rate of the pulse counter 34 to automatically reach its maximum count. The pulse counter 34 is supplied with pulses which, when the speed of the motion of any document under the window 4 is relatively constant, can be generated by a suitably adjusted clock circuit. If the speed is considered as substantially variable, the pulses can be generated from an arrangement of a type shown by way of example in FIG. 1. The table 3 of the reader presents downstream, with respect to the window 4, an elongated slot 35 which may be swept by the spot from the screen of a cathode ray tube 55. The light from the spot is focussed by a lens arrangement 59 on a member presenting a series of parallel and equidistant lines, 36. From a further lens system 60, the image is focussed on a photocell 37 the output of which is amplified at 38. The motion of the spot of the cathode ray tube is controlled from the movement of the front edge of the character carrier across the slot 35 so that, each time one step is made on the "rule" member 36, the photocell 37 issues a pulse which will trigger a pulse generator 39. The output of the generator 39 is connected to the lead 40 to the pulse advance input of the counter 34 which will, by this arrangement, be controlled in dependency on the speed of motion of the carrier of characters in the reader device. The number of pulses from the pulse generator 39, for each triggering, is so chosen that the counter 34 can reach its maximum count since it has been reset by a pulse from the circuit 28 at a time instant when the character was wholly within the window 4 and its image framed on the mosaic 12, so that no further identification is proposed to the system for the concerned character (no further pulse from 28 up to the maxmum count of 34). The pitch of the symbols or characters on their carrier may be varying within reasonable limits but nevertheless varying. In order to obtain a correct operation, the time alloted to the counter 34 to reach its maximum count must be comprised between $t_m$, lower time limit, and $t_M$, one-half of the upper time limit, of the time interval which may occur between the time instants when two successive symbols or characters have their image centered on the mosaic 12; such time limits are determined with respect to the said pitch of characters on their carrier and the average speed of advance of the carrier through the reader device. Let us call $t_d$ the time interval necessary for the counter 34 to reach its maximum count from a reset to zero. Let us call $t_A$ a time instant when one output of the discriminator 23 is activated. The activatiton of said output actually makes a proposal of identification of a symbol or character, cancelling any preceding proposal which could have been made from a previous activation of one of the bistable stages 29, as previously described. Simultaneously, said pulse resets the counter 34 to zero. This latter initiates a new count and a new bistable stage 29 is activated for a memorization of the new proposed identificatiton. If the counter reaches its maximum count before any further pulse occurs from 28, said maximum count will be reached at a time instant $t_A+t_d$; confirmation will be thus given that the proposed identification was the right one and an output 33 will be activated.

In a normal case, once an identification confirmation thus obtained, and, more definitely a proposed identification pulse issued from 23 at a time instant $t_A$, no further identification ought to be proposed prior to a time interval at least equal to $t_m$, hence prior to a time instant $t_A+t_m$. If however such a proposal occurred at a time instant $t_B$ comprises between $t_A$ and $t_A+t_m$, a decision could only occur after a time interval $t_d$, consequently at a time instant $t_B+t_d$ which is prima facie subsequent to the time instant $t_A+t_m$. As this is obviously an erroneous proposal, a pulse from 24 will have produced, prior to a decision instant a new proposal of identification which will have cancelled the preceding one.

The control of the motion of the cathodic spot from the displacement of the edge of the character carrier across the slot 35 may be effected from the output of the amplifier 38 which, by the lead 42, is applied to a summing amplifier 43 where it is opposed to a reference voltage at 44 adjusted for representing the average light on the photocell 37 when the spot travels between two lines of 36. The output analog voltage from 43 is applied to a transfer stage 46 the output of which is connected to the servo-amplifier 52 which, at 53, controls the deflection member 54 of the cathodic spot.

The spot must only travel from the instant when the leading edge of the carrier 2 appears in the slot 35. Such a condition is controlled from an inhibition applied to the transfer stage 46 so long as two photocells 49 respectively associated to two small windows on either sides of the slot 35 are simultaneously illuminated from two sources, unshown, and which are successively obscured by the passage of the carrier. The inhibition signal is generated by an AND-circuit 50 inserted between the outputs of said photocells and the transfer stage 46. When the output lead 51 from said circuit 50 blocks said transfer stage 46, the amplifier 52 is isolated from the output of 43 and the cathodic spot is brought near the left-hand edge of the slot 35 whereas it has remained near the right-hand edge of said slot prior to the escape of the carrier from the slot.

When desired, an additional control of the brightness of the spot may be provided. The output 43 is a signal representative of the difference of brightness of the spot, as measured from 37 and a reference value applied at 44, when the spot is at rest at a position wherefor its image is formed on a translucent portion of 36. Said output is applied to a transfer stage 47 which is controlled in a contradistinction of the transfer stage 46 so that the value of the output from 43 is, when the spot is at rest, preserved in a store 58, an analog store of the condenser kind for instance, the output of which is connected to the light control electrode 56 of the cathode ray tube through an amplifier 57. When the transfer stage 47 is blocked, the content of the store 58 maintains the brightness of the spot to the value defined during the rest periods of the spot.

The sensitivity of response of the photodiodes in the mosaic 12 may present variations both in their distribution in said mosaic and with respect to the time, even if they had been initially selected. It is possible, and it may be of advantage, to provide an automatic gain control of the amplifiers 15, for instance by periodically and automatically adjusting said gain with reference to optical signals such as, for instance, those derived from a readout of a black and white reference pattern which may be applied at the bottom of the window 4 and is automatically readable when no carrier of symbols or characters passes across said window. The circuits 16 which control the gain of the amplifiers 15 operate when no such character carrier is present as being unblocked from a signal applied on a lead 20 and issuing from an AND-circuit 19 receiving the outputs of two photocells 18 associated to two small windows 17 and separately lighted from sources which are occulated by the passage of such a character carrier through the reader. When both photocells 18 are lighted, the circuits 16 are authorized to operate from the outputs of the amplifiers 15 activated from the image of said reference pattern on the mosaic 12. Each circuit 16 detects the output from its associated amplifier 15, compares this output to a reference voltage, and the error signal thus obtained is applied as well known per se to the adjustment of one or more amplifier stage bias voltages in the amplifier 15 up to an output neighbouring the said reference voltage. Each circuit 16 preserves the error and correction voltage in an analog store, such as a capacitive store, so that, when at least one of the photocells 18 is occulated, and the circuits 16 are inhibited to further vary the gains of the amplifiers 15, they maintain said gains at their amended and adjusted values.

In the above described embodiment, and with respect to FIG. 3, the identification functions are considered of a linear coefficient structure, which satisfy of the simplicity of the function translating devices and of the operation of the discriminator 23 on maximum response values from said devices. For instance, such identification functions may be advantageously of the structure:

(i) $$Y_m(x_1 \ldots -x_n) = \frac{\Sigma m_i x_i}{\Sigma m_i} - \frac{1}{2}\frac{\Sigma m_i^2 \Sigma x_i}{\Sigma m_i}$$

in which M denotes any one of the symbols or characters to be identified, $x_1 \ldots -x_n$ denote the components from the amplifiers 15 and associated inverter amplifiers, $x_i$ denotes any component signal and $m_i$ any reference component of the symbol or character M when centered in the window 4 and consequently with respect to the mosaic 12 of photodiodes. A component $x_i$ is zero when the square of the mosaic does not receive any image from a portion of the pattern of the symbol or character M, and $x_i$ equals one when said square is totally covered by such a portion of pattern; the conditions are reversed for the outputs of the amplifiers 15 and the associated inverter amplifiers.

Let use call R the value of the resistance 66 of the summing amplifier of FIG. 3, $R_{mi}$ any one of the resistances 64 connected to an input terminal receiving a signal $+x_i$ and $R_{-mi}$ any one of the resistances 64 connected to an input terminal receiving a signal $-x_i$. Said resistances will be adjusted for satisfying the following relations:

(ii) $R/R_{mi} = K \cdot m_i / \Sigma m_i$ and (iii) $R/R_{mi} = \frac{1}{2} \cdot K \cdot (\Sigma m_i^2)/(\Sigma m_i)^2$ K is a mere coefficient which is freely chosen for a required value of the scale of the analog voltage variations in the circuit designs.

The identification function as defined in relation (i) is a particularized structure of a broader structure:

(iv) $Y_M(x_1 \ldots x_n, -x_1 \ldots -x_n)$
$= M_1 \cdot x_1 + M_2 \cdot x_2 + \ldots + M_n \cdot x_n$ wherein each of the coefficients $M_1, M_2 \ldots M_n$ is defined by the relation:

(v) $M_i = \delta\phi/\delta m_i$ (with $z_1 = m_1, z_2 = m_2 \ldots z_i = m_i \ldots$) which represents the partial derivative with respect to $z_i$ of a function of the first degree $\phi(z_1, z_2 \ldots z_n)$ which may be said, in the present case, to be the function generant of the linear identification functions described by the relations (iv) and (v) supra. Preferably, the generant function $\phi$ will be chosen not only homogeneous but also symmetrical with respect to its variables. As the values of the components are known for each of the symbols or characters to process in the identification system, it will be easy, after derivation of $\phi$ with respect to one of its variables, to determine the coefficients of the identification functions by substituting to the variables $z$ the values of the said reference components $m$ for computing the coefficients $M$ in accordance to the relation (v).

It may be checked, if desired, that the structure of the function of identification given by the relation (i) is a derivative from a generant function of the above defined kind, i.e.:

(vi) $$\phi = \frac{1}{2} \cdot \frac{\Sigma m_i^2}{\Sigma z_i}$$

the partial derivative with respect to $z_i$ is:

(vii) $\delta\phi/\delta z_i = (z_i/\Sigma z_i) - \frac{1}{2} \cdot \Sigma z_i^2/(\Sigma z_i)^2$ Recourse could have been made to identification functions of the non-linear kind. Such functions will have a zero value for centered symbols or characters to that this would complicate the analog function translators.

In the embodiment of FIG. 1, any document or support of the symbols and characters to be identified is assumed to be driven horizontal through a guide, which arrangement enables a relatively definite guiding of the document from which the symbols or characters must be read out. In actual practice however, such documents or supports will be driven in a vertical position and FIG. 5 concerns an embodiment according to the invention for such a condition of drive. In FIG. 5, 101 and 102 are two belts between which any symbol carrier is driven, being introduced on the fore side and being ejected on the rear side of the guide path defined by the cooperating parts of such belts. The lower edge of the document may be considered as somewhat guided or positioned but without any accuracy at all. The lower portion of the document 2 which presents a line of symbols or characters to read and identify, see for instance FIGS. 8 and 12, travels across a window 4 in a board 103 substantially parallel to the belts and under them. The image of said window 4 is formed on the mosaic 14/12 through an optical path comprising an object lens 106 of suitable angular opening, a first mirror 105, a second mirror 5, which is the mirror driven in high frequency alternating oscillation and the lens 13. As in the first embodiment, the mosaic may comprise a plurality of photodiodes defining a corresponding plurality of squares, see or instance FIG. 9, part (a). The light reflected by the document through the window 4 may be provided by means of one pair of small elongated lamp tubes affixed in holes of the board 103 and provided with cylindrical half-shell reflectors for directing their light on the rear of the board (the lamp and reflector arrangement is not detailed as obvious and is referred to as 104) so that one may consider the entire surface of the window as uniformly lighted from reflection of a uniform light on the document, in the absence of symbols of course. The block 100 in FIG. 5 is intended to represent the complete organization of identification starting from the mosaic in FIG. 1 (the counting pulses on lead 40 of said FIG. 1 are assumed to come from a suitably adjusted clock pulse generator).

In this arrangement, the part played by the mirror 105 is two-fold: first, it reflects the light on the oscillating mirror 5 so that the light reflected by the mirror 5 passes over the belt 102 to reach the mosaic; secondly, the angular position of the mirror 105 is controlled from a servomechanism 115 which controls a motor 114 itself controlling said angular position for purposes which will be hereinafter explained in full detail, as well as the constitution and operation of the arrangements the outputs of which feed said servomechanism.

The oscillating mirror 5 is controlled from a high frequency generator which, in this example of embodiment, is made as a self-sustained generator activated from a light source 143 which send a pencil of light on the rear face of the mirror 5, which is also provided as a reflecting face; this light pencil reflected by the mirror 5 reaches two photocells 133 and 136, the outputs of which are preamplified at 139 and 137, FIG. 6. The output from 139 passes through a pass-band filter 140 the pass-band of which is centered on the self-oscillating frequency of the carrier of the mirror 5, and through a phase-shifting network 141 of adjustable phase shift, to an amplifier 135. The circuit 139–140–141 is referred to as 134 in FIG. 5. The output of 135 is applied to the coil of an electro-magnet 8 the oscillating armature 7 of which is mechanically connected to the mirror 5 as previously described. The circuit loop from the photocell 133 to said electro-magnet 8 constitutes a self-sustaining loop for the oscillation of the mirror 5. The output of 137 is filtered and detected at 142 prior its application to a gain control input of the amplifier 135. The loop starting from the photocell 136 up to this gain control input of 135 is so adjusted as to maintain the amplitude of the oscillation of the mirror 5 to a substantially constant value from such an automatic control of the activation voltage of the electro-magnet 8. By said arrangement, which may be used in the embodiment of FIG. 1, the oscillating mirror 5 is accurately controlled for a constant amplitude constant frequency operation deprived of any substantial fluctuation or drift with respect to the time.

It is first assumed that the line of symbols or characters appears behind the window 4 as shown at (a) in FIG. 8, that is to say as an elongated area A substantially parallel to the lower edge of the document and at a substantially constant distance from said edge. Then the mirror 105 will merely assume the part of a reflector of the image of said area passing across the window 4, to the oscillating mirror 5 so that the image of any symbol or character will be at a time instant framed on the mosaic, see part (b) of FIG. 9, full line representation of the character (representations of a character in dotted lines in FIG. 9 correspond to the extreme positions of the image from the oscillation of mirror 5).

But such an ideal condition of presentation may not be satisfied and, for instance, on part (b) of FIG. 8, there is shown a deformation, either $B^1$ or $B^2$, which may be due to a drift of the alignment of the symbols or characters on the concerned line; and for instance too, part (c) of FIG. 8, the position of the line with respect to the lower edge of the document may be slightly shifted upward, as shown at $C^1$, or downward, as shown at $C^2$. Both defects may simultaneously occur. When the amplitude of such deviations of presentation go beyond a certain threshold value, either upwards or downwards, no correct read-out can be carried on any more, see parts (c) and (d) of FIG. 9, and such defaults of framing must be corrected.

According to a feature of the invention, it is provided to ensure such a correction in an automatic fashion from a control of angular position of the mirror 105 such that the image of the line of characters or symbols is formed on the read-out mosaic of photodiodes with such a centering that a condition such as shown on part (b) of said FIG. 9 is once again substantially satisfied. Such a correction is provided according to the remark that, when any symbol or character to be identified is correctly framed on the mosaic, whatever its own configuration or pattern may be, in each line $j$ of the mosaic there will be at least one square which receives a "black" portion of the image of the character or symbol, or that, at least, there will be as many lines in such a condition on both sides of the mid-section horizontal line of the area of the mosaic. From this remark, it is provided a correcting signal generator circuit 116 which, from its output 117, will control the input of corresponding reference of the servo-mechanism of FIG. 7 (contact 118 in said figure will be in its upper position) for suitably imparting to the mirror 105 a slant which will re-frame the image of the line of symbols or characters on the mosaic. In short, the circuit 116 will act for deriving from the photodiodes of each line of the mosaic an OR-signal representative of the existence or lack of a "black" in one square at least of said line of the mosaic; let us call $j_1, j_2 \ldots j_n$ the lines of the mosaic from top to bottom; the outputs of the said OR-circuits from $j_1$ to $j_{n/2}$ (when $n$ is even) or from $j_1$ to $j_{(n-1)/2}$ (when $n$ is odd) are summed up and so are the outputs of the OR-circuits from $j_{(n/2+1)}$ to $j_n$ (when $n$ is even) or from $j_{(n+1)/2}$ to $j_n$ (when $n$ is odd); a circuit will make the difference between these two summation analog signals and consequently issue a signal representative of the value of the vertical frame error, from which may be derived the control signal for the servomechanism 115.

FIG. 10 shows an illustrative embodiment of the correcting circuit 116. In said FIG. 6, $j_1, j_2 \ldots j_7, j_8$ refer to the OR-networks or circuits forming the union signal from the signals from the squares of the corresponding line of the mosaic of part (a) of FIG. 9. Each output of an OR-network is applied to one input of a comparator 144 receiving on its other input a reference voltage $s$ representing a threshold which ought to be surpassed by the OR-signal in order to eliminate stray information due, for instance, to blots on the documents or the like. The output of each comparator 144 is applied to an arrangement for detection of the existence or lack of a "black" in the concerned line of the mosaic. For instance, as shown, each such detecting arrangement includes two transfer stages 145 and 146 the outputs of which are applied to an OR-network 147. The signal from 144 is applied to both stages but as an authorization signal on one of them, as an inhibition signal on the other one of the pair. All information inputs of stages 145 receives an input reference voltage $-v$, all information inputs of stages 146, an input reference voltage $+v$. This is valid for lines $j_1$ to $j_4$ (the upper half of the mosaic, wherein 146 is inhibited for a signal representing a "black" and 145 is unblocked for a signal representing a "black"). Such conditions are reversed for the lower half of the mosaic, transfer stages 149 and 150, with respect to the same inputs $-v$ and $+v$, said stages being connected to an output OR-network 151. All output voltages from such detection circuits will be summed up through equal resistors 148 and 152 on the input of a summing amplifier 175. It is then obvious that the output signal from the summing amplifier 175 will at any time represent the difference of conditions of the upper and lower half of the mosaic.

However, as a symbol or character moves across the window 4, and as the symbols or characters are spaced apart in their sequence by a short blank, the output voltage of 175 will not at any time represent the actual condition of frame of a symbol or character with respect to the mosaic. Consequently, the output from 175 is applied to an analog store of the evolutive kind, essentially comprising a condenser 154 reached through a resistor 153 from said output, so that in said condenser an electric charge is developed which is representative of the average value of the degree of lack of centering of the image of the characters or symbols on the mosaic. Said condenser 154 is only authorized to charge when a switch 155 connected between a tap of the resistor 153 and the ground, is "open." A "closure" of the switch 155 will ensure a discharge of the condenser. Of course, said switch may comprise an electronic switching stage and not an electromechanical switch. The control of said switch will be hereinafter explained.

The voltage $V_y$ developed across the condenser 154 may be either positive or negative according to the direction of the asymmetry of the image of the characters on the mosaic. The motor 114 must be rotated in one direction or the other one according to said direction of asymmetry. The voltage $V_y$ is applied to the inputs of two circuits 156 and 157 respectively receiving reference voltages $-v'$ and $+v'$ on their other inputs. When $V_y$ is lower than $-v'$, the lack of vertical centering will be upwards and the circuit 156 issues a voltage of predetermined value, for instance $-v'$. When on the other hand, $V_y$ is higher than $+v'$, the lack of centering will be downwards and the circuits 157 issues a predetermined value output, which may also be $-v'$ from a mere inversion of polarity of $+v'$ through said circuit.

The outputs of the circuits 156 and 157, through transfer stages 158 and 159 the control of which will be hereinafter described, reach inputs of single-shot multivibrators 160 and 162 which in turn and with a slight predetermined delay $t$, respectively reach inputs of further single-shot multivibrators 162 and 163. The outputs of 160 and 163 are applied to an OR-network 164 and the outputs of 161 and 162 are applied to an OR-network 165. The output of 164 is applied to a transfer stage 166 on the other input of which is applied a voltage $+V$. The output of 165 is applied to the control input of a transfer stage 167 to the input of which is applied a voltage $-V$. The outputs from said transfer stages 166 and 167 are applied to an OR-network 178 the output of which is connected to the input 117 of the servomechanism of FIG. 7, the inverter 118 of which is in its upper position when the device is used.

Further, the outputs of the networks 164 and 165 are applied to an OR-network 168 the output of which controls a single-shot multivibrator 169. One output of 168 is applied to the control inputs of transfer stages 158 and 159. The other output from 169 activates at 171 a further single shot multivibrator 172 which output is routed, through an OR-network 173 to the control input of the switch 155. It is obvious that, when $V_y$ outpasses the limit values $-v'$ and $+v'$ in either direction, consequently needing a correction of positioning of the mirror 105, the transfer stages 158 and 159 must be blocked after the activation of the multivibrators 160 and 161, which is obtained from the activation of 169 which up to this time unblocked the stages 158 and 159, and the condenser 154 must be discharged from the closure of the switch 155 which is ensured from the activation of the multivibrator 172.

The operation may be detailed as follows: as long as a bistable circuit 174 is at rest, it applies to the switch 155 a control voltage which maintains said switch in its closed condition. When a symbol or character appears in the window 4, it produces at the output of 28, FIG. 1, a pulse which is applied to the actuation input of 174 so that the switch 155 opens and will remain opened the complete time interval the circuit 174 will be actuated. The condenser 154 is consequently authorized to get a charge. When said charge remains inside the limits $-v'$ and $+v'$, nothing happens and the mirror 105 remains in its previous position. This condition means that the sine wave movement of the mirror 5 suffices to get an image of any symbol or character in due vertical centering on the mosaic during its horizontal displacement in the window 4.

Then, when for instance the variation of the picture is such as in part $(d)$ of FIG. 9, the charge of the condenser will outpass the value $-v'$. The circuit 256 then issues a pulse activating the multivibrator 160, the output pulse $\epsilon_1$ of which activates in turn the multivibrator 162, which issues a pulse $\epsilon_2$, see graph $(a)$ of FIG. 11. Said pulses are separated by the time interval $t$ and, with such a time interval, a positive pulse $\epsilon_7$ and a negative pulse $\epsilon_8$ are transmitted to the input 117 of the servo-mechanism. The first pulse will produce a rotation of the motor 114 for a limited displacement of the mirror 105 from left to right for correcting the position of said mirror and the second pulse will brake the rotation of the motor up to a stop still. The pulse $\epsilon_1$ has triggered the multivibrator 169 which has delivered a signal $\epsilon_5$, part $(c)$ of FIG. 11, which has blocked the stages 158 and 159. When the multivibrator 169 sets back to rest, it actuates the multivibrator 172 which applies to pulse $\epsilon_6$ which temporarily closed the switch 155 so that the condenser is discharged, so that the control of the mirror 105 cannot be unduly duplicated.

Had the voltage across the condenser 154 outpassed the positive value $+v$, the control of the motor would have been ensured from the activation of the multivibrators 161 and 163 and consequently from the pulses $\epsilon_3$ and $\epsilon_4$ (with the same results as above concerning $\epsilon_5$ and $\epsilon_6$). In such a case, see part $(b)$ of FIG. 11, it would have been $\epsilon_8$, negative pulse, which actuated the motor and $\epsilon_7$, positive pulse, which stopped said motor.

It is clear from the above that the correction imparted to the position of the mirror 105 is a control by all or nothing and discrimination of the "sign" of the default to amend. The existence of the oscillating mirror 5 makes useless to act on the mirror 105 within the limits defined by the reference voltages $-v'$ and $+v'$.

The reset of the bistable circuit 174 for closing the switch 155 and whereby inhibiting the operation of the device is produced by application of a reset pulse on the input 177 of said device 174. Said reset pulse may be obtained as follows: Each pulse 28 from FIG. 1 is delayed in a channel ended by a transfer stage inhibited by any undelayed pulse 28. The last delayed pulse 28 can only pass through said transfer stage for resetting 174 and said pulse marks obviously the end of an identification operation of the symbols or characters on a document.

The switch 155 must be understood as being an electronic switch, for instance a transfer stage controlled from the multivibrators 172 and 174.

The output signals from the device of FIG. 10 are applied as said on the servo-mechanism controlling the motor 114. The inverter switch 118 in said servo-mechanism circuit must be in its upper position. Of course, said inverter switch is also an electronic switch, for instance comprising a pair of transfer stages one of which has its input connected to the terminal 117 and the other of which has its input connected to the output of an amplifier 131, FIG. 7, which will be hereinafter defined. An output lead from 174, i.e. 176 is applied to the control of said transfer stages for blocking the one connected to 131 when 174 is activated and vice versa for inhibiting the stage connected to input 117 when 174 is in its rest condition.

On both conditions of the switch 118, the servomechanism controls the positioning of the mirror 105. However for having an efficient read-out from the mosaic 14/12 and simultaneously an efficient operation of the correcting circuit as described above, the mirror 105 must be suitably positioned as soon as the read-out operation is initiated by the occurrence of the first symbol or character in the window 4. This would imply that the line of symbols preserve from document to document, a distance to the lower edge of substantially constant value. But such a distance may vary within wide limits, for instance as shown on the views $(a)$ and $(b)$ of FIG. 12, each of which shows a portion of such a document the lower line of symbols of which is to be read and the symbols of which must be identified. For illustrative purposes, view $(a)$ shows a document whereon the distance of the line to read and the lower edge is $H_1$ and view $(b)$ shows a higher distance $H_2$, said distance however not outpassing a maximum value $H_M$.

It would be difficult to correct such variations of distance from a mechanical control of the position of the document or its carrier in the vertical direction. It is consequently provided according to a further feature of the invention, to ensure such a correction from a prepositioning of the mirror 105 such that, when the document reaches the window 4, the position of the mirror 105 is already such that the image of the line of symbols to be read and identified be substantially formed on the mosaic 14/12. This is made possible by providing the height of the window 4 at a suitable value, for instance of a value slightly higher than $H_M-H_1$ when $H_1$ is the minimum distance of a line of symbols to the lower edge of the document.

The pre-positioning arrangement is made as follows: in the plate 103 near the opposite side of that which presents the window 4, consequently upstream with respect to the direction of movement of the document from the belts 101 and 102, a window 110 is associated to a light source and an object-lens 111 of sufficient opening to form the image of the window 110, from fixed mirrors 112 and 113 on a column of photocells 120 (through a collimating lens 119). The outputs of said photocells are combined by a device 121 which, from its output 122, is connected to a control input of the servo-mechanism controlling the position of the mirror 105 in order to meet the above defined condition of presentation of the image of the document on the mosaic 14/12 when said document will reach the window 4.

The column of photocells comprises for instance a number $n$ of photodiodes, from $C_1$ to $C_n$ in the upward direction. A symbol or character covers several photodiodes, for instance three photodiodes, $C_p$, $C_{p+1}$, $C_{p+2}$, and it is assumed that between two lines of symbols on the document, there will always be of a height of two photodiodes (meaning that a symbol can only be met again at photocell $C_{p+5}$, or even at photocell $C_{p+6}$ as shown in FIG. 13, an image of a symbol is not definitely centered with respect to the photo-diode areas).

The device 121 must operate for identifying the position of the image of the symbols with respect to the column of photodiodes 120. Obviously such a problem is in part, similar to the problem of identification of a character or symbol. According to FIG. 15, said device includes at the outputs of the diodes a distributor 181 of the elementary voltages, which distributes said voltages to a plurality of identification function translating devices 182 each of which is set to a particular value of a function of identification.

Said function may be termed as follows, the above particularities and assumptions being duly considered:

(i) $\quad Y_p = (x_p + x_{p+1} + x_{p+2}) - (x_{p+3} + x_{p+4})$
$$-(x_1 + x_2 + \ldots x_{p-1}$$

a photodiode $C_i$ (with $i = 1, 2, \ldots n$) delivering an output signal $x_i$ (with $i=1, 2, \ldots n$). The first term of this relation denotes the summation of the signals from three successive photodiodes in the column, the value of $p$ being of course varied from function translating device to function translating device. The second term denotes the summation of the signals from the photodiodes immediately above the three of the first term, and consequently corresponds to the space between two successive lines on the document. The third term represents the summation of the signals of all the photodiodes beneath the three of the first term. Such a relation obviously enables an identification of the position of the line off symbols nearest to the lower edge of the document as in such a case the second and third terms are zero and consequently the value of $Y_p$ is a maximum value.

Such a relation as (i) may also be written:

(ii) $Y_p = 2(x_p + x_{p+1} + x_{p+2}) + x_{p+5} + x_{p+6} + \ldots + x_n - \Sigma_i$ (with $i$ from 1 to $n$).

It is such a structure of the function $Y_p$ which is embodied by a function translating device according to FIG. 15. This device comprises the combination of three summing networks. The first operates the summation of the voltage signals $v_{p+5}$ to $v_n$, its summing resistors have a uniform value 2R, the second operates the summation of the voltage signals $v_p$, $v_{p+1}$ and $v_{p+2}$, its summing resistors have an uniform value R. The third operates the summation of the voltage signals $v_1$ to $v_n$, its summing resistors have a uniform value 2R and its output is inverted by a unit gain amplifier 179. The ouputs of the said first two networks and of said inverter amplifier are summed at the input of a summing output amplifier 180.

The outputs of the function translating devices 182 are applied to an OR-network 183 for introducing the voltage of higher value issuing from said network into an evolutive store of the kind described with reference to FIGS. 1 and 4, so that at any time the contents of the store will represent the higher voltage value from any one of the devices 182. When said store is read-out, its content is compared with all and any one of the voltages from the devices 182 in discriminator circuits 195 in a number equal to the number of devices 182 (distinct from the number of photodiodes), so that for any discrimination of a voltage from a device 182 equal to or higher than the content of the store 187, one of single shot multivibrators 196 is activated. In order to avoid a double identification, i.e. to discriminate between two multivibrators 196 which may be simultaneously activated for a position of the line of symbols intermediate between two groups of photodiodes as shown in FIG. 9, view (a) in its right-hand part, the outputs of the multivibrators 196 are directed to as many inputs of a logical circuit 198 the operation will be herein after explained. Said circuit 198 will make a choice and according to said choice, unblocks one of a plurality of transfer stages 199 for applying the signal from the selected multivibrator 196 to a transcoder arrangement 200, i.e. a conversion matrix which converts the received voltage into a digital code, for instance a binary code distinct for each of its activated inputs. At such times as it will be defined hereinbelow, said digital code will be stored through gates 202 into a digital code register 203 provided with a decoder arrangement 204 of the conventional kind for converting said digital code value into an analog voltage of an amplitude representing said value. The output of 204 is connected to a circuit 130 which actually is part of the input circuits of the servo-mechanism 115 of FIG. 7.

In said servo-mechanism, the inverter switch 118 must be in the its lower position as, if a read-out of a document through the window 4 is being made, no pre-positioning operation of the mirror 105 must be carried on, otherwise said, such two operations cannot interfere. When the inverter 118 is in its lower position, the input signal from 130 is amplified in 131 and 132 for controlling the angular positioning of the mirror 105 through a controlled rotation of the motor 114. Two feedback loops are shown, one from a tachometer generator 127 and the other from a potentiometer 128 so that a combining circuit 129 applies to the transfer stage 130 a servo-signal both from the speed of rotation and the position of the motor 114. Actually, the mechanism operates as a positioning servo and the motor stops once its equilibrium is reached so that the mirror 105 has its angular position so adjusted that, later on, when the document reaches the window 4, the image of the symbols are approximately formed on the mosaic. The positioning of the motor 114 is not modified until a further and different digital code is introduced in the register 203 and consequently the output voltage from 204 is not modified.

The operation of the device 121 must only begin when a line of symbols appear within the window 110, consequently only when the output OR-network 183 delivers a voltage representative of the actual appearance of the symbols in said window. For this purpose, the output of 183 is applied on a gate 184 on which is applied a reference threshold voltage $V_S$. When the output of 183 outpasses said reference voltage $V_S$, the output of said gate 184 is activated and results in the activation of bistable stages 185 and 186 provided that said bistable stage 185 is not inhibited and maintained at rest from the voltage applied on its input 176. Said voltage comes from the output of the bistable stage 174 of FIG. 10 which, as described, marks the periods of operation of the device of FIG. 10 and consequently the passage of a line of symbols across the window 4 of FIG. 5. When both the bistable stages 185 and 186 are brought to work, a gate or transfer stage 192 is unblocked. Said gate receives on its input the pulses $\sigma_1$ from a clock circuit 190. Further, when the bistable stage 185 comes to work, it resets to zero the content of the analog evolutive store 187, as well as the analog evolutive store of the circuit 125 which will be hereinafter described as of similar arrangement as the circuit 121.

The delay shown between the output of 183 and the input of 187 must only be understood as being a representation of the time interval of evolution of the content of the store 187 from one analog voltage to a higher one.

The clock pulses $\sigma_1$ passing through the gate 192 are applied to a circuit 189 which compares the values of the output voltages from 183 and 187, that is to say, the values of the voltage applied to the input of the store 187 and of the voltage existing at the output of said store. Let us call $V_e$ the voltage from 183 and $V_s$, the one from 187.

The pre-positioning of the mirror 105 must be made on an identification of the position of a line of symbols with respect to the height of the window 110, consequently of the photodiode column 120. However, it must be noted that as each symbol travels across said window 110, the outputs from the devices 182 vary and one of them (at least) passes by a maximum value during said variation, which value will appear at the output of 183 and consequently be stored in 187 and that, from symbol to symbol, said maximum value may be different so that within the store 187, the voltage may change too with respect to the time. Refering to FIG. 18, there is illustratively shown a possible evolution of the voltage $Y(t)$ within the store 187 in full line and at the input of the store, in interrupted line for parts of the evolution within which said input voltage is lower than the previously stored voltage. In said example, it is assumed that the first symbol passing across the window 110 builds up to a first level of voltage within the store, then decreases while said voltage level is maintained in the store and thereafter, the image of a further symbol produces a higher voltage to be stored prior decreasing under said higher voltage value, and so on. Once the first symbol has passed across the window 110, it is useless to consider any further variation of the store output since the actual positioning of the line of symbols has been defined from the first evolution of the output voltage from 183.

The position of the line of symbols with respect to the height of the window 110, consequently of the photodiode column 120, is identified from a read-out of the store 187 through a read-out arrangement 188 activated by pulses generated by a second clock pulse generator 191, pulses $\sigma_2$, passing through a gate 194 when said gate is unblocked. The voltage from the store 187 is compared, as said, with the voltages from the devices 182 in discriminator circuits 195. The control of the condition of the transfer stage or gate 194 is ensured from the pulses $\sigma_1$ and the comparator 189 by means of a bistable device 193. Said device 193 is set to work from the first pulse $\sigma_1$ passing through 192 and is reset when an output pulse is generated in the comparator 189 when the input voltage $V_e$ of the store 187 becomes lower than the voltage $V_s$ previously stored in 187. When bistable device 193 is reset, one output of it actuates to rest the bistable circuit 186 and the gate 192 is blocked. Consequently the content of the digital code register 203 is no more varied and the last obtained analog voltage from 204 is maintained for the servo-mechanism control. The position of the mirror 105 cannot then be changed from the circuit 121.

Each pulse $\sigma_2$ which has been previously transmitted to the read-out gate 188 of the store 187 may have produced a change in the content of the register 203. It must be noted that such pulse resets to zero the content of 203 just before unblocking the gates 202 and just after the logical operator 198 has operated on the outputs of the single-shot multivibrators 196. All such relative delays may be adjusted for substantially not interrupting the voltage output from 204 on the input of the servo-mechanism 115, in order to avoid useless rotations of the motor 114, which would occur if such interruptions existed.

As said, the analog evolutive store 187 may be of the kind shown in FIG. 16, a short description of which has already been given hereinabove. In a more detailed way, the operation of the circuit of FIG. 16 may be explained as follows: assuming first that the store is "empty," no voltage difference across the condenser 208, and that a first voltage input $V_e$ appears at the input of the store, in a positive direction, T1 and T2 are blocked. The transistor T4 is consequently blocked and the point 206 is brought to the high voltage positive value. The condenser 208 is charged from said high voltage point until, from the feedback from the output to the base of T2, T2 is totally unblocked, so is T1 and the transistor T4 saturates and cuts the connection between point 206 and the high positive bias voltage. The charge acquired by 208 during the time interval prior said cut off condition is proportional to the difference between $V_e$ and $V_s$ (which was zero). Thereafter, any positive variation of $V_e$ the same operation is repeated and the charge of 208 builds up. When, on the other hand, $V_e$ decreases, the charge of 208 does not vary since the voltage fed back to the base of T2 inhibits any possible switching of the states of T1 and T2. The width of the admission voltage span for the store is adjusted from the adjustment of the potentiometer 234 which, through T11, applies equilization potentials on the emitters T1 and T2. The reset to zero of the store is ensured by application of a signal on terminal 210 controlling the transistor T10 to apply the ground potential to the upper electrode of the storage condenser 208.

On FIG. 17 a possible structure of the circuit 189 of FIG. 15 is shown as comprising from the input to the output of the store 187 a lead containing a series unidirectional member 220 and two series-connected transformer windings. On the transformer 222 are applied the pulses from the clock 190 through the gate 192. From the other transformer then issue pulses to the bistable circuit 193 when such a lead is electrically closed, i.e. when $V_e$ presents a lower value than $V_s-\sigma_1$ or else such a transmission cannot occur since the unidirectionally conducting member remains blocked, as long as $V_e$ is higher than $V_s-\sigma_1$.

The circuit 188 may be similarly provided. Actually though separately shown in FIG. 15, it is constituted by as many parallel connected circuits as are comparator circuits such as 195. Across each output of a function translating device 182 and each input of a corresponding multivibrator 196 is provided a series circuit from 182 to the output of 187 comprising an unidirectionally conducting member 230 and two transformer windings. The pulses $\sigma_2$ passing through the gate 194 of FIG. 15 are applied to the primary winding of the transformer 231; each time $V_p$ is higher than $V_s-\sigma_2$, a pulse is transferred through the other transformer 232 to the activation input of the multivibrator 196. Such transformers are assumed to have a 1/1 ratio of transfer.

Referring back to the arrangement of FIG. 15, the logical circuits 198 and 199 receive the output voltages from the multivibrators 196 in both their plain and complement representations (complemented outputs are referred with a bar above the graphical symbol representing them).

As said and shown in FIG. 13, the symbols or characters may not be centered on the photodiodes of column 120. Consequently a character may, as shown, span over four photo cells $C_p$ to $C_{p+3}$. When this is the case, two successive or contiguous channels of identification may be simultaneously activated, i.e. their multivibrators 196 may be simultaneously activated. In the shown example it is considered that only the lower number channel of identification carries the correct information for pre-positioning the mirror 105. Consequently, the logical arrangement 198 operates for computing the function $(\overline{m_{i-1}} \cdot m_i)$ with $i=2, 3 \ldots n$ ($n$ is different from the number of photodiodes, and here denotes the number of activation channels), between the outputs of the multivibrators 196. The logical operator 198 further includes a circuit merely delivering $m_1$ since obviously, $m_{i-1}$ is zero for $i=1$ and consequently $\overline{m_{i-1}}$ is equal to 1. The other circuits obviously are mere AND-circuits each operating in accordance with the above logical function with the value of $i$ varying from circuit to circuit. The "upper" AND-circuit operates on $m_n$, plain output from the "upper" multivibrator 196, and on $\overline{m_{n-1}}$, complementary output from the immediately lower multivibrator 196, and so forth. The outputs from said logical AND-circuits in 198 are distributed in correspondence to control inputs of the transfer stages or gates 199 inserted between the plain representation outputs of the multivibrators 196 and the corresponding inputs of the conversion matrix 200: the transfer stage 199 receiving $m_n$ is controlled from the output of the AND-circuit operating on $m_n$ and $\overline{m_{n-1}}$, and so forth. Such an arrangement duly eliminates duplication of identification in successive pairs of channels. However, it leaves an uncertainty on the definite position of the symbol with respect to the photodiodes. Such an uncertainty, or better said, imprecision, may be reduced by the provision of an additional binary digit of lowest order which is separately formed and introduced in the register 203 when two successive identification channels actually are simultaneously activated. To the logical circuits 198 is associated a further logical circuit 199 the output 201 is routed to the input of an additional transfer stage 202 to an additional input of the register 203. Said circuit 199 operates on the logical function $\Sigma(m_{i-1} \cdot m_i)$ for $i=2, 3 \ldots n$. It consequently comprises a plurality of AND-circuits, each effecting such an elementary logical operation as $(m_{i-1} \cdot m_i)$ with a different value of $i$, and an OR-circuit receiving the outputs of said AND-circuits on as many inputs as are such AND-circuits. When two successive channels are activated from the circuits 195, the logical arrangement 199 delivers a binary digit 1;

when this is not the case, the output from 199 represents a binary digit 0.

With the device of FIG. 15, a pre-positioning of the mirror 105 is consequently obtained. A refinement is provided when needed, comprising the provision of a further window 107 between 110 and 4 which, through an object-lens 108, the mirror 105, a fixed mirror 109 and a collimating lens 123, forms the image of any symbol passing across it on a further column of photodiodes 124. From the outputs of said columns 124 is fed a device 125 which is very similar to the device 121 and which, consequently, is not detailed in FIG. 15 where only the output decoder 204[1] is shown with its output to the stage 130, input of the servo-mechanism. The unshown analog store in said second circuit may be cleared from the output of the bistable stage 185 of the device 121. From the bistable stage 186[1] in said second circuit a reset may be provided for 186 of the first as an additional security. Said second pre-positioning arrangement is provided when one fears drifts or mechanical latches which can deteriorate the pre-positioning of the mirror 105 from the first pre-positioning arrangement.

When both devices are provided in an equipment, both analog voltage outputs from 204 and 204[1] are simultaneously applied to the input stage 130 of the control servo-mechanism, which is quite normal, the voltage from 204[1] only correcting the voltage from 204 (the scales of voltages are adjusted to this purpose). Further, the registers 203 may be left in their conditions during a read-out for identification of a document through the window 4 since the inverter switch of the servo-mechanism cuts off said registers from the servo-mechanism (they cannot interfere).

What is claimed is:

1. A system for automatically identifying graphical symbols such as alphabetical and/or numerical characters comprising the combination of:
   (a) a photoelectric reader wherein supports for said symbols are driven in a continuous manner past a readout window the optical image of which is formed on a mosaic of photocells, the mosaic providing a plurality of elementary signals which are each representative of the variation of the average value of the light with respect to time from one of the elementary areas defined by said photocells in said mosaic;
   (b) as many identification function translating devices as are varieties of symbols to identify, each device providing a representation of a particular identification function and each device directly receiving a combination of said elementary signals from the said mosaic, the output of each of said devices being variable and passing through a predetermined voltage amplitude when the amplitudes of the said elementary signals in the applied combination present a distribution characteristic of the identification function represented by said device;
   (c) an analog voltage store permanently fed with an OR combination of the outputs of said identification function translating devices and storing the value of the one of the outputs from said devices that is substantially equal to the said predetermined amplitude;
   (d) as many comparator circuits as are identification function translating devices, each comparator circuit receiving the output of one of the said devices, and each comparator circuit connected to receive the output of said analog voltage store to compare the said outputs and to generate an output pulse when a substantial identity of input values is present at a comparator circuit.

2. A system for automatically identifying graphical symbols such as alphabetical and/or numerical characters comprising the combination of:
   (a) a photoelectric reader device wherein supports for symbols are driven in a continuous manner past a readout window the optical image of which is formed on a mosaic of photocells, the mosaic providing a plurality of elementary signals which are each representative of the variation of the average value of light with respect to time from one of the elementary areas defined by said photocells;
   (b) as many identification function translating devices as are species of symbols to identify, each device providing a representation of a particular identification function and each device directly receiving a combination of said elementary signals, the output of each of said devices reaching a predetermined voltage amplitude when the amplitudes of the said elementary signals in the applied combination present a distribution characteristic to the identification function represented by said device;
   (c) an analog voltage store permanently fed with the OR logical combination of the outputs of said identification function devices for storing the value of the one of said outputs that is substantially equal to the said predetermined voltage amplitude, said store including a read-out output;
   (d) means for periodically reading out said store at a rate higher than the rate of passage of symbols across said read-out window;
   (e) as many comparator as are identification function translating devices, each comparator circuit being connected at an input to an identification function translating device and at a second input to the read-out output of said analog store to provide a comparator circuit output pulse in the presence of a substantial identity between both inputs;
   (f) as many pulse temporary stores as comparator circuits, each temporary store having an input connected to an output of an associated comparison circuit and being set by a pulse on said output;
   (g) and timing means for resetting said pulse temporary stores whenever an additional pulse issues from one of the said comparison circuits within a predetermined time interval and for reading out said temporary stores in the absence of said additional pulse.

3. A system for automatically identifying graphical symbols such as alphabetical and/or numerical characters according to claim 2, wherein said timing means comprises a counter, a clock delivering pulses to a count input of said counter, an output connection from said counter for reading-out the said pulse temporary stores and for resetting said counter and said analog voltage store to zero, an OR circuit receiving the pulses from said comparison circuits and output leads for resetting said pulse temporary stores and said counter each time one of said comparison circuits issues a pulse, and delay leads from the outputs of said comparison circuits to the inputs of said pulse temporary stores.

4. A system according to claim 1 wherein a mirror is interposed in the optical path from said read-out window to said mosaic of photocells, said mirror being supported at one end of a torque pendulum and oscillated thereby so as to move the image formed on said mosaic in a direction transverse to the direction of the images of the characters across said mosaic, the other end of said torque pendulum being connected to an oscillatory armature of an electromagnet, the electromagnet being energized by a high frequency sinusoidal source.

5. A system according to claim 4, wherein the said drive is ensured from a self-sustained oscillation arrangement comprising the combination of a light source directed to a reflecting face of said mirror opposite to the face reflecting the light from said window, at least one photocell receiving the said reflected light, and amplifying and filtering means connecting the output of said photocell to the actuating coil of the said electro-magnet.

6. A system according to claim 5, wherein the light reflected by said mirror also falls on a second photocell spaced apart from the first and the output of which filtered and amplified, is applied as a gain control voltage to an amplifier in the path from the first photocell to the said electromagnet coil for maintaining said gain at a substantially constant value.

7. A system for automatically identifying graphical symbols such as alphabetical and/or numerical characters according to claim 1, further including a slantable mirror interposed between the said read-out window and the said mosaic of photocells, a servo-mechanism for controlling the slant of said mirror, and means associated to the photocell outputs of said mosaic for controlling the said servo-mechanism so as to adjust the slant of said mirror when an image of symbols appears out of center on said mosaic of photocells.

8. A system according to claim 7, wherein said means includes: means for forming OR signals from the elementary areas of each line of the mosaic of photocells, and means responsive to said OR signals for grouping signals from the upper half of the mosaic in opposition to signals from the lower half of the mosaic so as to produce servo-mechanism positioning control signals to thereby control the slant of said mirror.

9. A system according to claim 8 wherein said control signals deriving means includes means for comparing the signals in each of said opposed groups to a pair of threshold voltages of opposite polarities and generating said positioning control signals only when the signals from said opposition outpasses one of said threshold voltages.

10. A system according to claim 8, wherein said positioning signal from said groups is stored in an analog condenser store and means are provided for resetting said store each time a control signal is generated.

11. A system according to claim 9, wherein said control signal generating means comprise means for generating a pair of opposite polarity and time spaced pulses applied to the input of said servo-mechanism, the occurrence of the pulses in such a pair being reversed according to what threshold voltage is outpassed by the output voltage of said store.

12. A system for automatically identifying graphical symbols such as alphabetical and/or numerical characters according to claim 1, further comprising a mirror interposed between the said read-out window and the said mosaic of photocells, a servo-mechanism for controlling the slant of said mirror, at least a further window upstream with respect to the read-out window, means for forming an optical image of said further window on a column of photocells and means for deriving from said photocell outputs a signal representative of the height of the line of symbols to be later identified as it passes across said further window and further means for deriving from such a position identifying signal a slant control signal for said mirror such that the image of said line will be formed on said mosaic of photocells from such a pre-positioning of said mirror.

13. A system according to claim 12, wherein said first deriving means comprise a plurality of position identification function translating devices each receiving a combination of the signals from the photocells and each recording a particular function so that the output of any one of said devices passes by a predetermined voltage value when the amplitude distribution of said photocell output signals is characteristic of the identification function recorded in said device, an analog voltage store fed with the OR combination from said translating devices, said store preserving the value of the voltage from said OR combination which is the nearest to or is equal to the value of the said predetermined voltage, means for permanently comparing the actual value of said OR combination as it varies with respect to the time and the voltage value stored in said analog voltage store, means for periodically reading-out said store as long as said comparing means does not detect that the value of the OR combination becomes lower than the stored voltage value, as many comparison circuits as are identification function translating devices, each comparing the output of one of said device to the read-out voltage value from said analog store, and said further deriving means comprise a transcoder having as many outputs as are such comparison circuits, a plurality of pulse temporary stores having their inputs connected to the outputs of said comparison circuits and having their outputs connected to the inputs of said transcoder, a digital code register and means for transferring in said register the outputs of said transcoder each time the said analog voltage store is read-out, and a digital to analog converter permanently activated from said register and having its output connected to the activation output of said servomechanism.

14. A system according to claim 13, wherein said further deriving means comprise means for combining the outputs of said comparison circuit temporary stores for eliminating one over two of a pair of outputs of said temporary stores, which may have been simultaneously activated, in their connections to said transcoder from a control of gates inserted between the outputs of said temporary stores and the inputs of said transcoder.

15. A system according to claim 14, wherein means are provided for so combining the outputs of said temporary stores that an additional pulse is provided each time two outputs from said temporary stores are simultaneously activated and introducing such a pulse in said register for activation of an additional one-digit portion thereof.

16. A system according to claim 12, wherein the said further window and the means associated thereto are duplicated for a two-step prepositioning of said mirror as the support of symbols travels towards the identification reader, wherein the outputs of said two arrangements are simultaneously applied to the input of said servo-mechanism and wherein the second prepositioning arrangement has the said mirror interposed in its optical path from its window to its column of photocells so acting as a prepositioning correction device with respect to the first.

17. In a system for automatically identifying graphical symbols such as alphabetical and/or numerical characters, the system comprising a photoelectric reader including a mosaic of photocells facing a read-out window, means for forming as many combinations of elementary signals from said photocells as are species of symbols to identify, means associated with said last named means for detecting the occurrence of any one of said combinations corresponding to an amplitude value distribution characteristic of particular identification function and responsive to such correspondence to produce an identification signal in an output channel of the system, the system further including a servo-mechanism controlled slantable mirror interposed between said read-out window and said mosaic of photocells, the improvement including in the system:

means for prepositioning the slant of said mirror in accordance with the height of a line of the symbols at a time prior to the passage of the symbols through said read-out window, said prepositioning means including photoelectric pick-up means located upstream of said read-out window and control signal forming means operatively associated with said pick-up means controlling said servo-mechanism, second means for providing additional control over the slant of said mirror during the passage of the line of symbols through said read-out window, said second means including means for combining the output of the photocells of said mosaic and deriving therefrom a second control signal for controlling the operation of said servo-mechanism, and means for automatically switching the input of said servo-mechanism from the output of said prepositioning means to the output of said second positioning means and conversely when no coexistence conditions exist in the outputs of said prepositioning control means and said second means.

References Cited

UNITED STATES PATENTS

| | | | |
|---|---|---|---|
| 3,432,646 | 3/1969 | Perry | 235—61.11 |
| 3,104,369 | 9/1963 | Rabinow et al. | 340—146.3 |
| 3,104,371 | 9/1963 | Holt | 340—146.3 |
| 3,225,329 | 12/1965 | Rabinow | 340—146.3 |
| 3,142,761 | 7/1964 | Rabinow | 340—146.3 |

OTHER REFERENCES

IBM Technical Disclosure, January 1964, vol. 6, No. 8, p. 122.

THOMAS A. ROBINSON, Primary Examiner

U.S. Cl. X.R.

235—61.11